Nov. 4, 1924.  
A. V. VERVILLE  
1,514,410  
DETACHABLE GASOLINE TANK  
Filed Dec. 14, 1922  
2 Sheets-Sheet 2
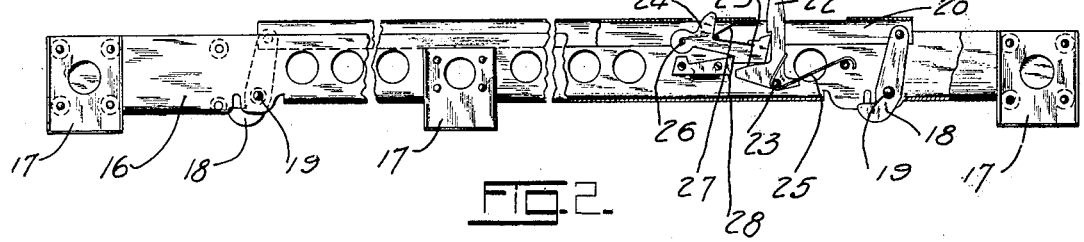
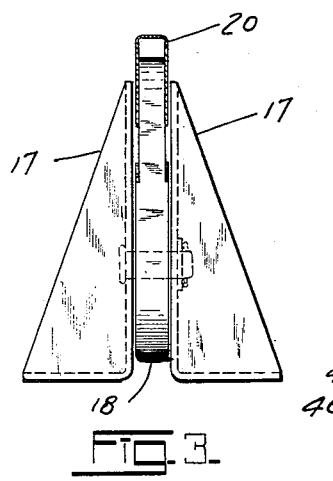
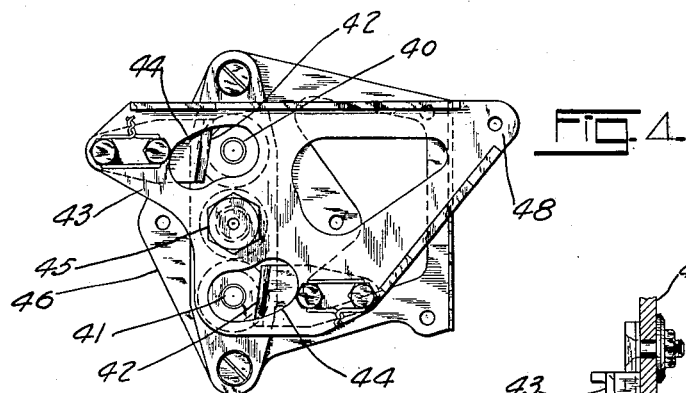
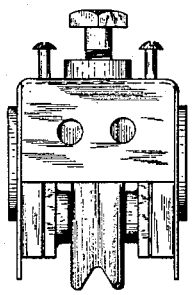
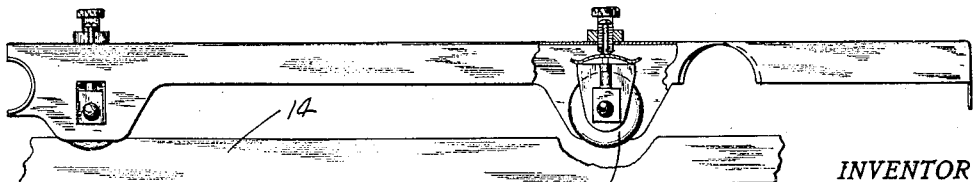
INVENTOR  
Alfred V Verville  
BY Robert H Young  
ATTORNEY Patented Nov. 4, 1924.

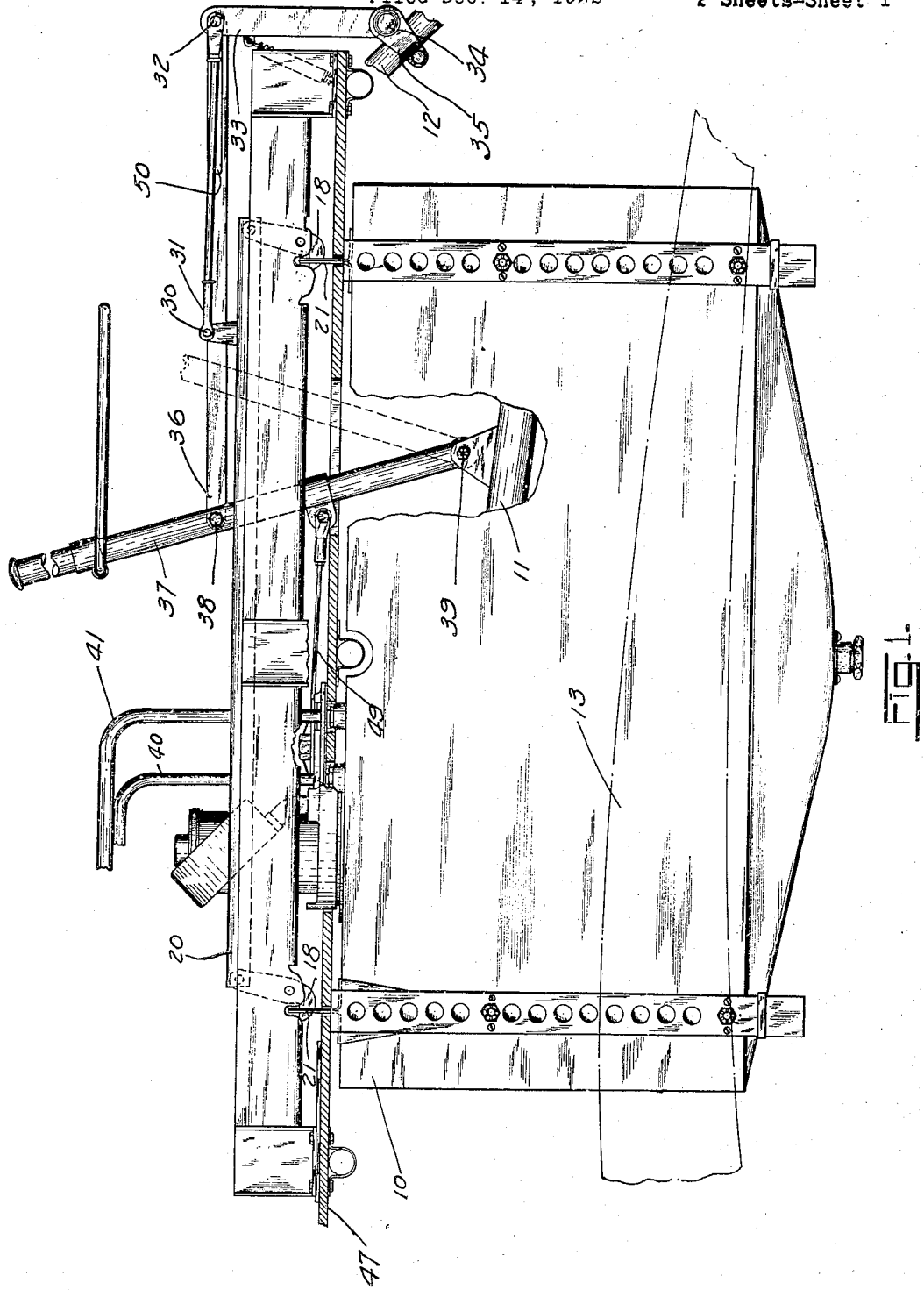

1,514,410

UNITED STATES PATENT OFFICE.

ALFRED V. VERVILLE, OF DAYTON, OHIO.

DETACHABLE GASOLINE TANK.

Application filed December 14, 1922. Serial No. 607,001.

*To all whom it may concern:*

Be it known that I, ALFRED V. VERVILLE, a citizen of the United States, residing at Dayton, in the county of Montgomery and State of Ohio, have invented certain new and useful Improvements in Detachable Gasoline Tanks, of which the following is a specification.

This invention relates to detachable gasoline tanks, the broad object in view being to provide means under the control of the pilot for releasing and dropping the fuel tank or reservoir from an aircraft in case of fire or other dangerous conditions. While the invention will be described as applied to the gasoline tank of an aircraft, it will be apparent that the invention is applicable to any vehicle-carried reservoir containing any material whether inflammable or not.

The invention consists in the novel construction, combination and arrangement herein fully described, illustrated and claimed.

In the accompanying drawings:

Fig. 1 is a view partly in side elevation and partly in section of the main gasoline tank of an airplane, showing the invention.

Fig. 2 is a vertical longitudinal section through the tank supporting shackle.

Fig. 3 is an enlarged end view thereof.

Fig. 4 is a plan view of the pipe shearing device.

Fig. 5 is an edge view thereof.

Fig. 6 is a side view of the roller bracket.

Fig. 7 is an end view thereof.

The gasoline tank 10 is shown as mounted in the frame of the body or fuselage of an airplane, 11 designating the bottom longerons of the fuselage, 12 some of the bracing members thereof, and 13 the lower supporting plane or aerofoil.

The space occupied by the tank 10 is open at the bottom to enable the tank to be dropped through the bottom of the fuselage. To insure against jamming or binding of the tank when released from its holding means, anti-friction tank-guiding means are employed and shown as consisting of any suitable number of guiding strips or track rails 14 secured to the frame of the fuselage, and rollers 15 journalled on the normally vertical tank walls. Even when the aircraft is not on an even keel, the arrangement just described will insure the free movement and dropping of the tank.

The tank 10 is supported by a shackle arrangement best illustrated in Fig. 2 and comprising a shackle or hanger bar 16 carried by supports 17 fastened to the frame of the fuselage. The bar 16 extends longitudinally of the fuselage and has two or more tank-suspending hooks 18 mounted thereon by pivots 19 so offset from the bills of the hooks that the weight of the tank and its contents will, when the hooks are released, swing said hooks on their pivots and permit the tank to drop therefrom by gravity. The hooks are coupled together by a yoke bar 20, and the tank has eyes or rings 21 which are engaged by the hooks 18.

The hooks 18 are locked in tank-supporting position by means of a trigger 22 connected by pivot 23 to the hanger bar 16 and held in engagement with a latch 24 by a spring 25. The latch 24 is connected by pivot 26 to the yoke bar 20 and is held by a spring 27 in engagement with a keeper and projection 28 on the hanger bar 16. The trigger 22 has a cam face 29 which operates against the latch 24 to swing the latter clear of the keeper 28. This unlatches the yoke bar 20 leaving the hooks 18 free to swing on their pivots under the weight of the tank which then drops through the bottom of the fuselage.

The trigger 22 is connected by pivot 30 to one end of a rod 31, and the other end of rod 31 is connected by pivot 32 to a supporting link 33 pivotally supported at 34 on a small bracket or clip 35 on one of the frame bars 12. A connecting link 36 such as a rod, extends from the pivot 32 to a manual control lever 37 to which it is attached by pivot 38. The lever 37 is mounted at its lower end on a pivot 39 on the frame of the fuselage.

Prior to tripping the tank-supporting hooks 18 and releasing the tank, the pipe or pipes of the tank are severed by a shearing device. Ordinarily there are two pipes 40 and 41 connected to the top of the tank, one being a fuel feed pipe and the other a vent pipe. These pipes must be severed before the tank is released. The severing of said pipes is accomplished by means of a pair of shearing cutters 42 (see Fig. 4) properly located with respect to the pipes 40 and 41 on a cutter plate 43 having openings or slots 44 through which said pipes pass. The cutter plate 43 turns on a pivot 45 on a base or mounting plate 46 fastened to a frame member 47 in the fuselage and above the tank. An arm 48 of the cutter plate 43 is coupled by a link 49 with the operating lever 37. The connecting rod 36 has a longitudinal slot 50 through which the pin 32 passes. This permits the lever 37, as it is pulled back, to first operate the pipe severing means and then on further movement thereof to actuate the trigger 22, to release the hooks 18 and permit the tank to drop clear of the aircraft. The trigger 22 is not operated until the bar 36 moves the length of slot 50 and the end wall of said slot pushes against the pin 32. Then the rod 31 is pulled and the trigger is operated, but in the meantime the pipes of the tank have been sheared off. The flight of the aircraft may be continued for a short time on account of the fuel supply in the usual overhead gravity-feed tank which has received its supply from the main 10 through the now severed feed pipe 40.

To drop the tank, all the pilot has to do is to pull back the single control lever 37. In such movement of the lever the shearing device is operated first to sever the pipes of the tank, and thereafter the tank-supporting means are tripped and the tank released and permitted to drop through the bottom of the fuselage, or any body, frame or housing in which it is mounted.

I claim:—

1. In an aircraft, a tank-carrying frame having an opening in the bottom thereof through which the tank is adapted to be dropped, a tank detachably supported in said frame, means for severing the pipes connected to the tank, and means operable subsequently to said severing means to release and drop the tank.

2. In an aircraft, a tank-carrying frame having an opening in the bottom thereof through which the tank is adapted to be dropped, a tank, tank-supporting means in said frame, means for severing the pipes connected to the tank, and means operable subsequently to the severing means to release the tank-supporting means.

3. In an aircraft, a tank-carrying frame having an opening in the bottom thereof through which the tank is adapted to be dropped, a tank, tank-supporting means in said frame, means for severing the pipes connected to the tank, and means operable subsequently to the severing means to release the tank-supporting means, the pipe severing means and the releasing means being operable by a single manual control.

4. In an aircraft, a tank-carrying frame having an opening in the bottom thereof through which the tank is adapted to be dropped, a tank, tank-supporting means in said frame, means for severing the pipes connected to the tank, and means operable subsequently to the severing means to release the tank-supporting means, the pipe severing means and the releasing means being operable by a single manual control and linkages which cause the successive operation of the two last named means.

5. In an aircraft, a tank having a pipe connected thereto, tank-supporting means, pipe-severing means, and means for tripping the tank-supporting means after the operation of said pipe severing means.

6. In an aircraft, a tank having a pipe connected thereto, tank-supporting means, pipe-severing means, and means for tripping the tank-supporting means, the pipe-severing means and the tripping means being operable successively in the order named by a single manual control.

7. In an aircraft, a tank having a pipe connected thereto, tank-supporting means, pipe-shearing means, and means for tripping the tank-supporting means after the operation of said pipe shearing means.

8. In an aircraft, a tank-carrying frame having an opening in the bottom thereof through which the tank is adapted to be dropped, a tank detachably supported in said frame, anti-friction tank guiding means for directing the tank through said opening, means for severing the pipes connected to the tank, and means operable subsequently to said severing means to release and drop the tank.

9. In an aircraft, a tank-carrying frame having an opening in the bottom thereof through which the tank is adapted to be dropped, a tank detachably supported in said frame, guiding means including rollers for directing the tank through said opening, means for severing the pipes connected to the tank, and means operable subsequently to said severing means to release and drop the tank.

In testimony whereof I affix my signature.

ALFRED V. VERVILLE.